(No Model.) 2 Sheets—Sheet 1.
H. LOMAX & W. HASARD.
MACHINE FOR CUTTING AND SHOCKING CORN.
No. 422,427. Patented Mar. 4, 1890.
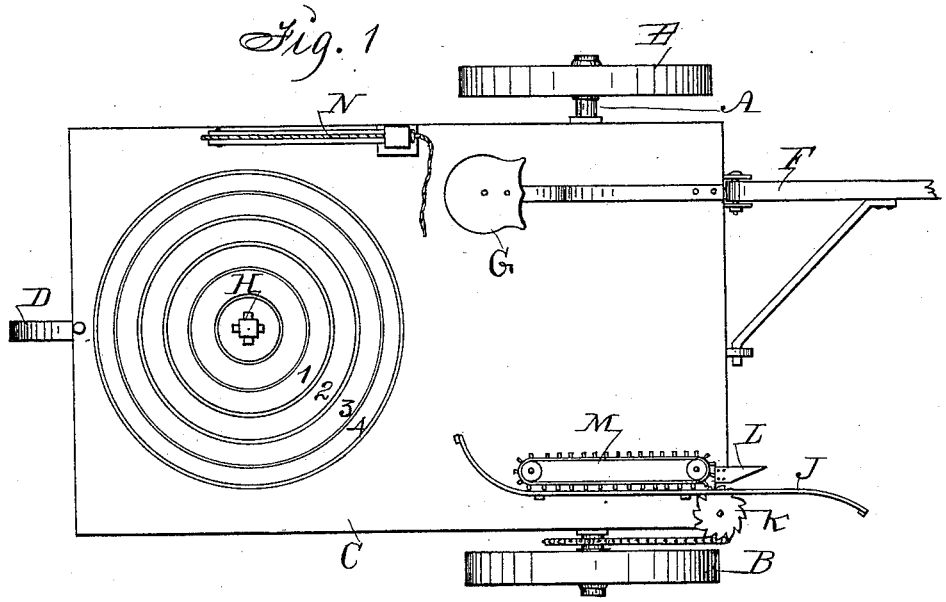
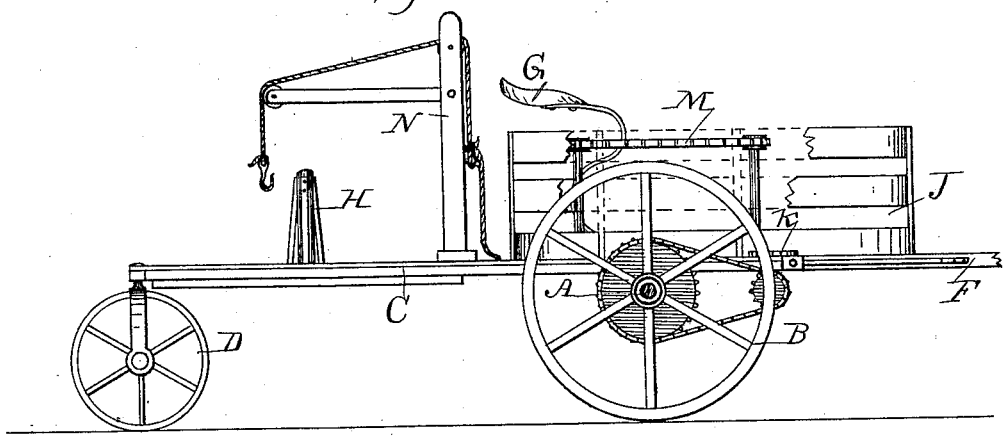

(No Model.)  2 Sheets—Sheet 2.

H. LOMAX & W. HASARD.
MACHINE FOR CUTTING AND SHOCKING CORN.

No. 422,427.  Patented Mar. 4, 1890.

UNITED STATES PATENT OFFICE.

HARVARD LOMAX AND WALTER HASARD, OF CONGDON, NEBRASKA.

MACHINE FOR CUTTING AND SHOCKING CORN.

SPECIFICATION forming part of Letters Patent No. 422,427, dated March 4, 1890.

Application filed July 21, 1888. Serial No. 280,668. (No model.)

*To all whom it may concern:*

Be it known that we, HARVARD LOMAX and WALTER HASARD, citizens of the United States of America, and residents of Congdon, in the county of Dawson and State of Nebraska, have invented a Corn Harvester and Shocker, of which the following is a specification.

Our object is to save time, labor, and expense in cutting off corn in the field and securing it in shocks on the ground; and our invention consists in the construction of a machine, as hereinafter set forth, in such a manner that it can be advanced in a field by means of horses and automatically operated to cut off the cornstalks near the ground, keep them upright, and move them toward a platform and a post or frame, so that a person can readily gather them around the post to form a shock that when clamped and bound can be readily lifted off and placed upright upon the ground by means of a crane carried on the machine.

Figure 1 of the accompanying drawings is a top view, and Fig. 2 a side view, illustrating the construction and operation of my machine. Fig. 3 is a front view, from which part of the carriage-frame is broken away.

A is a carriage-axle supported upon traction-wheels B.

C is an oblong frame and platform fixed upon the axle.

D is a caster-wheel attached to the rear center portion of the platform.

F is a pole attached to the front at one side of the platform.

G is a driver's seat fixed on a seat-bar on top of the front portion of the platform and in line with the pole.

H is a post fixed on top and center of the rear portion of the platform.

Nos. 1 2 3 4 represent a series of concentric grooves in the top surface of the platform and around the post H.

J represents a fence or fender that is curved in opposite directions at its ends and fixed upon the top and right front corner and side of the platform in such a manner that it will aid in directing, supporting, and moving the cornstalks.

K is a horizontally-rotating sickle at the right corner of the platform that extends inward under the fender.

L is a cutter fixed to the platform to project forward in such a position relative to the sickle and fender that it will aid in cutting off the cornstalks as they come in contact with the sickle.

M is an endless carrier that rises above the platform and extends parallel with the straight and central portion of the fender J in such a manner that it will move the cornstalks along the fender that are cut off by the sickle and supported by the fender rearward as the machine is advanced in line with a row of corn, and motion imparted to the sickle and the carrier by means of gearing that connects them with a driving-wheel fixed to the axle A or one of the wheels B, or in any other suitable way, as required to operate the sickle and the carrier in concert.

$M^2$ (shown in Fig. 3) is a rotating shaft in bearings fixed to the frame C. $r$ and $s$ are bevel-gears fixed thereto. $N^2$ is the axle of the sickle $k$. It has a bevel-gear $r'$ on its lower end that engages the wheel $r$. $N^3$ is one of the posts that supports the endless carrier M. It has a bevel-gear $s'$ on its lower end that engages the wheel $s$. A sprocket-wheel $s''$ on the axle A and a sprocket-wheel on the end of the shaft $M^2$ are connected by means of a drive-chain, as required, to transmit motion (and increase speed) from the carriage-axle to the shaft for the purpose of rotating the sickle and carrier connected with the shaft $M^2$ by means of the bevel-gears.

As corn is thus cut off near the ground, retained upright, and moved rearward on the platform, a person on the platform can readily take bunches successively and set them in the concentric grooves around the post H to form a shock, and when a sufficient quantity is placed around the post the machine is brought to a rest until the shock is bound and removed from the platform by means of a pivoted crane N, fixed upon the top and side of the platform.

We claim as our invention—

A corn harvester and shocker, comprising a carriage frame and platform supported upon a rotating axle and two wheels at its front end and a caster-wheel at its rear end and center, a pole at its front end, a circular sickle rotating in a horizontal plane at the top of the front corner of the carriage-platform, a cutter projecting forward from the platform to cooperate with the sickle in cutting off corn, a fender fixed on top of the carriage-platform to project vertically and to extend forward and rearward from the sickle, an endless carrier on rotating posts that project vertically from the carriage-platform at the side of the fender, gearing to transmit power and motion from the rotating axle to the sickle and the endless carrier, a platform having concentric circular grooves in its top surface at the rear portion of the carriage-frame and a post rising from its center, and a crane at the side of the carriage-frame, arranged and combined to operate in the manner set forth, for the purposes stated.

<div style="text-align:right">HARVARD LOMAX.<br>WALTER HASARD.</div>

Witnesses:
McD. FITZGERALD,
M. FITZGERALD.